United States Patent
Kunz et al.

(10) Patent No.: US 10,162,791 B2
(45) Date of Patent: Dec. 25, 2018

(54) METHOD FOR TRANSMITTING A USB SIGNAL AND USB TRANSMISSION SYSTEM

(71) Applicant: ROSENBERGER HOCHFREQUENZTECHNIK GMBH & CO. KG, Fridolfing (DE)

(72) Inventors: Stephan Kunz, Chieming (DE); Thomas Müller, Berchtesgaden (DE); Gunnar Armbrecht, Mühldorf am Inn (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 0 days.

(21) Appl. No.: 15/037,891

(22) PCT Filed: Nov. 20, 2014

(86) PCT No.: PCT/EP2014/003097
§ 371 (c)(1),
(2) Date: May 19, 2016

(87) PCT Pub. No.: WO2015/074754
PCT Pub. Date: May 28, 2015

(65) Prior Publication Data
US 2016/0292126 A1 Oct. 6, 2016

(30) Foreign Application Priority Data
Nov. 21, 2013 (DE) .................. 10 2013 019 588

(51) Int. Cl.
*G06F 13/40* (2006.01)
*G06F 13/42* (2006.01)
(Continued)

(52) U.S. Cl.
CPC ........ *G06F 13/4295* (2013.01); *G06F 13/385* (2013.01); *H04L 5/20* (2013.01); *H04L 25/0276* (2013.01)

(58) Field of Classification Search
None
See application file for complete search history.

(56) References Cited

U.S. PATENT DOCUMENTS 6,150,612 A * 11/2000 Grandy .................. H01B 11/02
174/113 C
6,507,608 B1 * 1/2003 Norrell .................. H04L 5/023
370/200

(Continued)

FOREIGN PATENT DOCUMENTS

CN 103108487 A 5/2013
DE 102010027400 A1 1/2012
(Continued)

OTHER PUBLICATIONS

"Phantomkreise erhoehen die DSL-Datenkapazitaet", NTZ (Nachrichtentechnische Zeitschrift), VDE Verlag GMBH, DE, Bd. 61, Nr. 6, Jun. 1, 2008 (Jun. 1, 2008), Seiten 9-12, XP001514752, ISSN: 0948-728X.
(Continued)

*Primary Examiner* — Ilwoo Park
(74) *Attorney, Agent, or Firm* — DeLio, Peterson & Curcio, LLC; Robert Curcio

(57) ABSTRACT

A method for transmitting three data signals from a USB signal in which the first data signal is transmitted differentially via a first conductor pair and the second data signal is transmitted differentially via a second conductor pair. A signal portion of the third data signal is transmitted as a common mode component via the first conductor pair and a reference portion of the third data signal is transmitted as a common mode component via the second conductor pair. A
(Continued)

USB transmission system for carrying out this method and an adapter for a USB transmission system are presented.

22 Claims, 1 Drawing Sheet

(51) Int. Cl.
*H04L 5/20* (2006.01)
*G06F 13/38* (2006.01)
*H04L 25/02* (2006.01)

(56) References Cited

U.S. PATENT DOCUMENTS

| | | | |
|---|---|---|---|
| 2004/0239374 A1* | 12/2004 | Hori | H03K 5/003 327/65 |
| 2010/0104029 A1 | 4/2010 | Lee | |
| 2013/0162320 A1 | 6/2013 | Van Den Berg et al. | |
| 2013/0223293 A1* | 8/2013 | Jones | H04L 5/14 370/276 |
| 2014/0211095 A1* | 7/2014 | Dickens | H04N 5/38 348/723 |
| 2015/0008011 A1* | 1/2015 | Koeppendoerfer | H01B 7/0009 174/113 R |
| 2016/0147704 A1* | 5/2016 | Guillerm | G06F 13/4068 710/106 |

FOREIGN PATENT DOCUMENTS

| | | |
|---|---|---|
| DE | 102012000935 A1 | 7/2013 |
| EP | 2509250 A1 | 10/2012 |
| JP | 2002204272 A | 7/2002 |
| JP | 2004356714 A | 12/2004 |
| JP | 20111-513883 A | 4/2011 |
| JP | 2012-507204 A | 3/2012 |
| JP | 2013-510410 A | 3/2013 |
| TW | 201123749 A | 7/2011 |
| TW | 201208276 A | 2/2012 |
| WO | 2012/034802 A | 3/2012 |
| WO | 2012/139685 A1 | 10/2012 |
| WO | 2012136648 A1 | 10/2012 |
| WO | 2013/126830 A1 | 8/2013 |

OTHER PUBLICATIONS

Wim Foubert et al: "Exploiting the Phantom-Mode Signal in DSL Applications", IEEE Transactions on Instrumentation and Measurement, IEEE Service Center, Piscataway, NJ, US, Bd. 61, Nr. 4, Apr. 1, 2012 (Apr. 1, 2012 ), Seiten 896-902, XP011429402, ISSN: 0018-9456, DOI: 10.11 09/TIM.2011.21741 00.
Universal Serial Bus 3.1 Specification, Revision 1.0, Jul. 2013, 5 pages.
Gabara, Thaddeus, Phantom Mode Signaling in VLSI Systems; ARVLSI 2001 (Advanced Research in VLSI).

* cited by examiner

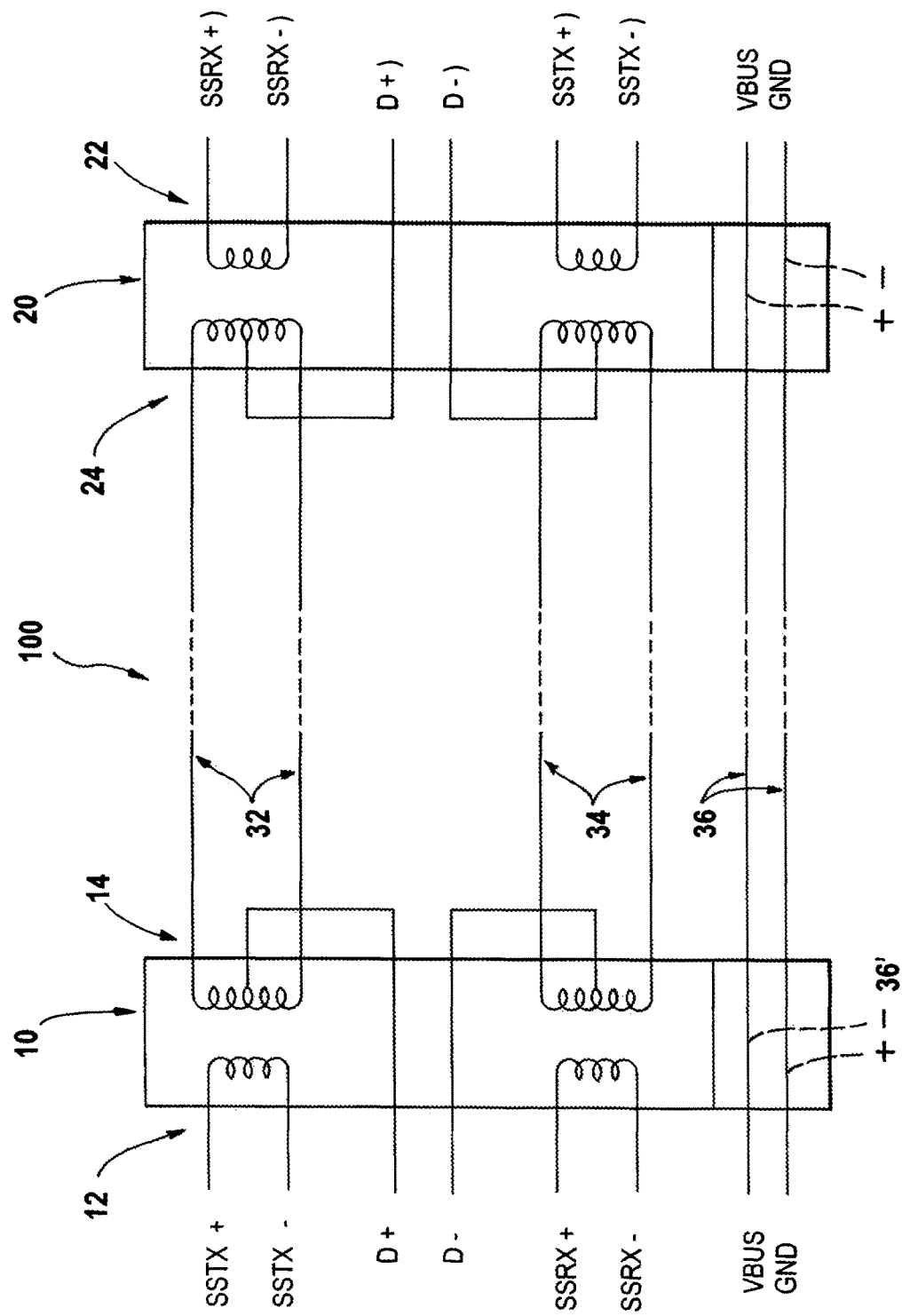

METHOD FOR TRANSMITTING A USB SIGNAL AND USB TRANSMISSION SYSTEM

BACKGROUND OF THE INVENTION

1. Field of the Invention

The invention relates to a method for transmitting three data signals of a USB signal in which the first data signal is transmitted differentially via a first conductor pair and the second data signal is transmitted differentially via a second conductor pair. The invention also relates to a system for transmitting USB signals and an adapter for such a system.

2. Description of Related Art

Conventional USB2 interfaces (for example USB 2.0 interfaces) have a signal conductor pair (D+ and D−) and a conductor pair for the power supply (GND, VBUS). The data transmission takes place symmetrically and bi-directionally via the signal conductor pair, whereby the data signal ("signal portion") is transmitted through one conductor of the signal conductor pair and the corresponding inverted data signal ("reference portion") is transmitted through the other conductor. For this purpose a cable designed for the transmission of USB2 signals has, as a signal conductor pair, two twisted and shielded conductors in order as far as possible to avoid transmission interference. The signal receiver forms the differential voltage of the data signal transmitted via the signal conductor pair differentially (namely symmetrically), so that interference affecting both conductors of the signal conductor pair equally is eliminated.

The transmission of USB signals is necessary in an extremely wide variety of technical applications. For example, a USB socket can be required in a rear section of a vehicle in order to allow USB devices to be plugged in, so that a USB cable needs to be passed through the vehicle from the front to the rear. USB sockets or USB connections can also be required in various locations (offices, public facilities, means of transport, etc.) for the connection of USB devices, whereby USB cables need to be laid for this purpose. As explained above, two conductor pairs are sufficient for the transmission of a conventional USB2 signal (data signal and supply voltage), so that four-wire cables were formerly laid for the transmission of USB signals.

A few years ago, the USB3 standard was introduced. USB3 interfaces (for example USB 3.0 interfaces) have, in addition to the aforementioned connections (D+, D−, GND, VBUS), at least two additional signal conductor pairs (SSTX+ and SSTX−; SSRX+ and SSRX). A differential data signal is transmitted or fed into the USB interface via each of these two signal conductor pairs. Overall, this allows higher data rates to be achieved than with the conventional USB2 standard.

Consequently, in order to achieve USB3 compatibility, new plug connectors on the host and on the connected devices and additional data transmission cables are necessary. For this purpose, a further four-wire cable was laid for the transmission of USB3 signals, whereby the aforementioned eight USB3 connections (D+, D−, GND, VBUS, SSTX+ and SSTX−; SSRX+ and SSRX−) are then transmitted via two four-wire cables. The total of three data signals are thereby transmitted differentially via in each case one conductor pair (D+ and D−; SSTX+ and SSTX−; SSRX+ and SSRX−). However, the laying of additional cables involves considerable expense.

Alternatively, instead of the two four-wire cables, it is naturally possible to lay a single standard USB3 cable. However, laying such a cable involves even greater expense, since the old USB2 cables need to be removed and the new USB3 cables are expensive.

SUMMARY OF THE INVENTION

In view of the described problems it is the object of the present invention to provide a method for transmitting USB signals with at least three data signals which requires less expense and fewer changes than the conventional method.

This problem is essentially solved in that a signal portion of the third data signal is transmitted as a common mode component via the first conductor pair and a reference portion of the third data signal is transmitted as a common mode component via the second conductor pair.

The above and other objects, which will be apparent to those skilled in the art, are achieved in the present invention which is directed to a method for transmitting three data signals from a USB signal in which the first data signal is transmitted differentially via a first conductor pair and the second data signal is transmitted differentially via a second conductor pair, wherein a signal portion (D+) of the third data signal is transmitted as a common mode component via the first conductor pair and a reference portion (D−) of the third data signal is transmitted as a common mode component via the second conductor pair.

The method includes, following transmission, the third data signal can be assembled from the common mode component of the signal transmitted via the first conductor pair and the common mode component of the signal transmitted via the second conductor pair as the differential data signal (D+', D−').

Additionally, before transmission, the signal portion of the third data signal is added, as a common mode component, to the first data signal which is to be transmitted differentially, and the reference portion of the third data signal is added, as a common mode component, to the second data signal which is to be transmitted differentially.

Furthermore, the signal portion of the third data signal transmitted in common mode corresponds in amount to the reference portion of the third data signal transmitted in common mode, but with the opposite sign.

The method further includes shielding the two conductor pairs by a common shielding, wherein the two conductor pairs may be laid in a star quad arrangement.

The method may also include transmitting a USB3 signal, wherein the USB3 data are transmitted differentially from the host to the device (SSTX+ and SSTX−) via the first conductor pair (32) and the USB3 data are transmitted differentially from the device to the host (SSRX+ and SSRX−) via the second conductor pair (34), while the D+/D− signal is transmitted via a phantom circuit.

In a second aspect, the invention is directed to a USB signal transmission system including two adapters connected together via two pairs of transmitter signal conductors, wherein each of the adapters has a USB interface for the input/output of a USB signal, such that the USB interfaces in each case have three pairs of USB signal conductors (SSTX+, SSTX−; SSRX+, SSRX−; D+, D−) for the differential transmission of USB data signals which are coupled via a phantom circuit with the two pairs of transmitter signal conductors.

The first USB signal conductor pair is an SSTX signal conductor pair (SSTX+, SSTX), the second USB signal conductor pair is an SSRX signal conductor pair (SSRX+, SSRX−) and the third USB signal conductor pair is a D signal conductor pair (D+, D−).

The two pairs of transmitter signal conductors may be arranged in a cable in a star quad form.

The USB signal transmission system may further include a supply conductor pair running between the two adapters which is connected with supply conductor pairs (VBUS, GND) of the USB interfaces.

The USB signal transmission system may include a USB3 connection socket and/or a USB3 connection cable connected to at least one of the USB interfaces.

The shielding starts out from the first USB interface and running via both adapters and the transmitter signal conductor pairs up to the second USB interface for electromagnetic shielding of the data signals.

The adapter includes a first interface in the form of a USB interface with three USB signal conductor pairs (SSTX+, SSTX−; SSRX+, SSRX−; D+, D−), each pair being configured for the differential transmission of a USB data signal, and with a second interface with two transmitter signal conductor pairs, each pair being configured for the differential transmission of a data signal, such that a first common mode component is added to the differential USB data signal which is to be fed via the first USB signal conductor pair (SSTX+, SSTX−) in order to generate a first differential transmission signal for transmission via the first transmitter signal conductor pair (32) and a second common mode component is added to the differential USB data signal which is to be fed via the second USB signal conductor pair (SSRX+, SSRX−) in order to generate a second differential transmission signal for transmission via the second transmitter signal conductor pair (34), wherein the first common mode component corresponds to a signal portion (D+) of the differential USB data signal which is to be fed via the third USB signal conductor pair (D+, D−) or a multiple or a fraction thereof and the second common mode component corresponds to a reference portion (D−) of the differential signal which is to be fed via the third USB signal conductor pair (D+, D) or a multiple or fraction thereof.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 shows a schematic circuit plan of a USB transmission system according to the invention which is suitable for carrying out the method according to the invention.

DESCRIPTION OF THE PREFERRED EMBODIMENT(S)

In describing the preferred embodiment of the present invention, reference will be made herein to FIG. 1 of the drawings in which like numerals refer to like features of the invention.

In a preferred embodiment of the present invention, the three data signals which are to be transmitted differentially are transmitted not via the three conductor pairs which are, properly speaking, necessary, but via only two conductor pairs. Cables with two wire pairs are already laid in numerous technical applications, for example in vehicles, offices, etc., so that no additional cables need to be laid for the desired transmission of the three USB3 data signals.

The supply signal which is additionally necessary in order to supply voltage to the USB device can usually be fed more simply by other means, without additional cables needing to be laid. For example, in automobiles a d.c. voltage supply is in any case available in a wide variety of locations which can readily be used. Moreover, unlike conductor pairs used for the transmission of data signals, the conductor pair used for the transmission of the supply voltage does not require complete shielding, nor symmetrical and even twisting etc., so that if necessary an additional cable for providing the supply voltage can be laid.

The invention is based on the knowledge, originating from the field of analog telephony that under certain conditions three differential data signals can be transmitted via only two conductor pairs, namely when the third data signal is transmitted via a so-called phantom circuit. For this purpose, the signal portion of the third data signal which corresponds to the inverted reference portion of the third data signal, or a multiple or a fraction thereof (preferably half the signal portion D+/2) is transmitted as a common mode component via the first signal conductor pair and the reference portion of the third data signal which corresponds to the inverted signal portion, or a multiple or a fraction thereof (preferably half the reference portion D−/2) is transmitted as a common mode component via the second signal conductor pair.

In other words, prior to transmission, the signal portion of the third data signal can be added, as a common mode component, to the first data signal which is to be transmitted differentially, and the reference portion of the third data signal can be added, as a common mode component, to the second data signal which is to be transmitted differentially.

Following transmission, the third data signal can be assembled from the common mode component of the signal transmitted via the first conductor pair and the common mode component of the signal transmitted via the second conductor pair as a differential data signal. The first data signal and the second data signal are not affected by the transmission of the third data signal via the same conductors, since the signal portions and reference portions of the first and second data signals are in each case shifted by the same amount (in the common mode), so that the difference, which represents the actual data stream, remains unchanged. This principle is fundamentally known from the field of analog telephony, and in this respect reference is made to the relevant technical literature.

In view of the low susceptibility to interference, it has thereby proved advantageous for the first data signal, the second data signal and/or the third data signal to be fed in symmetrical form before the step of adding the common mode component. In other words, the signal portions of the differentially fed USB signals correspond in each case to the inverted reference portions. In particular, the signal portion of the third data signal transmitted in common mode via the first signal conductor pair corresponds in amount to the reference portion of the third data signal transmitted in common mode via the second signal conductor pair, whereby, however, the signal portion and reference portion have opposite signs.

In order to protect the data signals against external interference through electromagnetic interference fields, the two conductor pairs can be shielded by means of a common shielding.

A particularly low-interference transmission is possible if the two conductor pairs are laid in a star quad arrangement, preferably in the form of an HSD transmission system. The HSD transmission system carries two symmetrical conductor pairs in a cable. Both pairs are surrounded by a common shield. The individually insulated conductors are thereby arranged in the form of a star quad and can be twisted together. Two conductors arranged opposite one another in the star quad foot a common differential wire pair.

This means that there is always a symmetrical pair in the virtual ground plane of the respective second pair. This makes it possible to realize a high crosstalk attenuation while at the same time keeping the cable as compact as possible.

The method according to the invention is particularly suitable for the transmission of a USB3 signal, for example a USB 3.0 signal, whereby the USB3 data are transmitted from the host to the device (SSTX+ and SSTX−) via the first conductor pair and the USB3 data are transmitted from the device to the host (SSRX+ and SSRX−) via the second conductor pair, while the D+/D− signal is transmitted via the phantom circuit.

A further aspect of the invention relates to a USB signal transmission system with two adapters which are connected together via two pairs of transmitter signal conductors, whereby each of the adapters has a USB interface for the input/output of a USB signal.

According to the invention, the USB interfaces in each case have at least three pairs of USB signal conductors which are in each case configured for the differential transmission of a USB data signal. The three pairs of USB signal conductors are coupled with the two pairs of transmitter signal conductors via a phantom circuit.

In other words the adapters in each case possess means for adding a first common mode component to the differential signal fed via the first USB signal conductor pair in order to generate a first differential transmission signal for transmission via the first transmitter signal conductor pair and means for adding a second common mode component to the differential signal fed via the second USB signal conductor pair in order to generate a second differential transmission signal for transmission via the second transmitter signal conductor pair, whereby the first common mode component corresponds to a signal portion of the differential signal fed via the third USB signal conductor pair or a multiple or fraction thereof and the second common mode component corresponds to a reference portion of the differential signal fed via the third USB signal conductor pair or the multiple or the fraction thereof.

The USB signal transmission system according to the invention thus has in each case three conductor pairs as input and output, each conductor pair being configured for the transmission of a differential USB data signal, while the transmission itself takes place via only two conductor pairs. The third USB data signal is transmitted via the third conductor pair provided via the phantom circuit.

Preferably, the first USB signal conductor pair is an SSTX signal conductor pair (SSTX+ and SSTX−), the second USB signal conductor pair is an SSRX signal conductor pair (SSRX+ and SSRX−) and the third USB signal conductor pair is a D signal conductor pair (D+ and D−). The data signal transmitted via the D signal conductor pair is thus transmitted as a virtual signal.

In terms of achieving a low-interference transmission, it has proved advantageous for the two pairs of transmitter signal conductors to be arranged in a star quad form and preferably designed as an HSD connection. For this purpose, the two adapters are advantageously connected by means of a star quad cable. Alternatively or in addition, HSD plug connectors in the form of HSD sockets or similar can be arranged at the adapter outputs connected with one another via the transmitter signal conductors, said plug connectors being connected with one another via a star quad cable or another cable with at least two conductor pairs.

In addition, a supply conductor pair can run between the two adapters which may be connected with supply conductor pairs of the USB interfaces.

It is practical for a USB3 connection socket and/or a USB3 connection cable to be connected to at least one of the USB interfaces.

The susceptibility to interference of the USB data signals which are to be transmitted can be reduced through an electromagnetic shielding starting out from the first USB interface and running via both adapters and the transmitter signal conductor pairs up to the second USB interface for electromagnetic shielding of the data signals.

In conventional phantom circuits, coils are often present in which the common mode component is added to the differential first and second data signals by feeding the phantom currents (signal portion and reference portion of the third differential data signal) into the secondary centers. As a result, the magnetic effects cancel one another out and the phantom currents do not induce any voltage on the primary sides of the coils.

Alternatively, the phantom circuits can be realized through digital switching elements in the adapters, for example through circuit boards arranged in each of the adapters containing logical switching elements such as digital addition and/or subtraction.

According to a particularly important aspect of the invention, an adapter for a USB signal transmission system is provided which has a first interface for the input/output of a USB signal and a second interface, in particular an HSD interface. The first interface is designed in the form of a USB interface with three USB signal conductor pairs, each pair being configured for the differential transmission of a USB data signal, and the second interface has two transmitter signal conductor pairs, each pair being configured for the differential transmission of a data signal. According to the invention, the adapter is equipped with means for adding a first common mode component to the differential signal which is to be fed via the first USB signal conductor pair in order to generate a first differential transmission signal for transmission via the first transmitter signal conductor pair, and means for adding a second common mode component to the differential signal which is to be fed via the second USB signal conductor pair in order to generate a second differential transmission signal for transmission via the second transmitter signal conductor pair, whereby the first common mode component corresponds to a signal portion of the differential signal which is to be fed via the third USB signal conductor pair or a multiple or a fraction thereof and the second common mode component corresponds to a reference portion of the differential signal which is to be fed via the third USB signal conductor pair or a multiple or fraction thereof.

In a particularly preferred embodiment, the second interface is an HSD interface. A USB3 socket (for example a USB 3.0 socket) and/or a USB3 cable (for example a USB 3.0 cable) can be connected to the USB interface. An HSD socket, an HSD plug connector and/or an HSD cable can be connected to the second interface.

Referring to FIG. 1, USB transmission system 100 has in total two adapters 10 and 20 according to the invention. Each adapter 10, 20 has on one side a conventional USB3 interface 12, 22 (for example a USB 3.0 interface) and on the other side a second interface 14, 24 which has two signal conductor pairs 32, 34 for the differential transmission of data signals.

The second interface can in each case be, for example, an HSD interface.

The second interfaces 14, 24 of the two adapters 10, 20 can be connected with a cable in which two, in each case twisted, conductor pairs run, for example in the manner of a star quad arrangement. The two conductor pairs can in each case be shielded. Preferably, the cable with the two conductor pairs 32, 34 has an outer conductor as common shield.

The two adapters 10, 20 can be connected by means of a further conductor pair 36 carrying a supply voltage (for example 5V DC voltage). However, this further conductor pair 36 is not essential to the invention, and a supply voltage 36' can also be fed externally to one or two USB interfaces 12, 24, for example through the voltage supply which is in any case present in an automobile.

Each of the two USB interfaces has the usual USB3 connections SSTX+, SSTX−; SSRX+, SSRX−; D+, D−. A first differential data signal can be fed to the connection pair SSTX+, SSTX−, the signal portion of which is referred to in the following as SSTX+ and its reference portion referred to in the following as SSTX−. USB signals are normally transmitted symmetrically. The difference between SSTX+− SSTX− represents the actual data stream. If the absolute values of the voltages of the signals SSTX+ and SSTX− shift by the same amount due to interference, the difference between the values remains unchanged.

A second differential data signal can be fed to the connection pair SSRX+, SSRX−, the signal portion of which is referred to in the following as SSRX+ and its reference portion referred to in the following as SSRX−.

A third differential data signal can be fed to the connection pair D+, D−, the signal portion of which is referred to in the following as D+ and its reference portion referred to in the following as D−.

The signal portion D+ of the third differential signal is transmitted as a common mode component via the transmitter signal pair 32. This means the signals (SSTX+)+(D+/2) and (SSTX−)+(D+/2) are transmitted via the first signal pair 32. The difference between these signals produces (SSTX+)−(SSTX−) and thus the data stream of the first data signal. The total of these signals produces (SSTX+)+ (SSTX−)+(D+)=(D+), since (SSTX+)=−(SSTX−).

The reference portion D− of the third differential signal is transmitted as a common mode component via the transmitter signal pair 34. This means the signals (SSRX+)+(D−/2) and (SSRX−)+(D−/2) are transmitted via the second signal pair 34. The difference between these signals produces (SSRX+)−(SSRX−) and thus the data stream of the second data signal. The total of these signals produces (SSRX+)+(SSRX−)+(D−)=(D−), since (SSRX+)=− (SSRX−).

Possible sources of interference acting as a common mode signal on both transmitter signal pairs 32, 34 are eliminated in the subtraction (D+)−(D−).

According to the invention it is thus possible to transmit three USB data signals differentially via only two conductor pairs. Through the use of the adapters according to the invention at the two ends of the cables with two conductor pairs which are already laid in numerous technical applications, USB3 signals can thus be transmitted without any need to lay additional cables.

The adapter according to the invention for use in the USB transmission system according to the invention can be realized in the form of a circuit board with digital switching elements such as addition and/or subtraction, whereby a USB3 socket can be coupled to the USB interface of the adapter and an HSD plug connector and/or a star quad cable can be coupled to the second interface of the adapter.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for transmitting three data signals from a USB signal in which the first data signal is transmitted differentially via a first conductor pair and the second data signal is transmitted differentially via a second conductor pair, wherein a signal portion (D+) of the third data signal is transmitted as a common mode component via the first conductor pair and a reference portion (D−) of the third data signal is transmitted as a common mode component via the second conductor pair.

2. The method of claim 1, including, following transmission, the third data signal can be assembled from the common mode component of the signal transmitted via the first conductor pair and the common mode component of the signal transmitted via the second conductor pair as the differential data signal (D+', D−').

3. The method of claim 1, wherein before transmission, the signal portion of the third data signal is added, as a common mode component, to the first data signal which is to be transmitted differentially, and the reference portion of the third data signal is added, as a common mode component, to the second data signal which is to be transmitted differentially.

4. The method of claim 3, wherein the signal portion of the third data signal transmitted in common mode corresponds in amount to the reference portion of the third data signal transmitted in common mode, but with the opposite sign.

5. The method of claim 1, including the two conductor pairs shielded by a common shielding.

6. The method of claim 5, including the two conductor pairs laid in a star quad arrangement.

7. A method for transmitting three data signals from a USB signal in which the first data signal is transmitted differentially via a first conductor pair and the second data signal is transmitted differentially via a second conductor pair, wherein a signal portion (D+) of the third data signal is transmitted as a common mode component via the first conductor pair and a reference portion (D−) of the third data signal is transmitted as a common mode component via the second conductor pair, the method including transmitting a USB3 signal, wherein USB3 data from the USB3 signal are transmitted differentially from a host to a device (SSTX+ and SSTX−) via the first conductor pair (32) and the USB3 data are transmitted differentially from the device to the host (SSRX+ and SSRX−) via the second conductor pair (34), while the D+/D− signal is transmitted via a phantom circuit.

8. A USB signal transmission system including two adapters connected together via two pairs of transmitter signal conductors, wherein each of the adapters has a USB interface for the input/output of a USB signal, such that the USB interfaces in each case have three pairs of USB signal conductors (SSTX+, SSTX−; SSRX+, SSRX−; D+, D−) for the differential transmission of USB data signals which are coupled via a phantom circuit with the two pairs of transmitter signal conductors.

9. The USB signal transmission system of claim 8, wherein the first USB signal conductor pair is an SSTX signal conductor pair (SSTX+, SSTX−), the second USB signal conductor pair is an SSRX signal conductor pair (SSRX+, SSRX−) and the third USB signal conductor pair is a D signal conductor pair (D+, D−).

10. The USB signal transmission system of claim 8, wherein the two pairs of transmitter signal conductors are arranged in a cable in a star quad form.

11. The USB signal transmission system of claim 8, including, additionally, a supply conductor pair running between the two adapters which is connected with supply conductor pairs (VBUS, GND) of the USB interfaces.

12. The USB signal transmission system of claim 8, including a USB3 connection socket and/or a USB3 connection cable connected to at least one of the USB interfaces.

13. The USB signal transmission system of claim 8, including a shielding starting out from the first USB interface and running via both adapters and the transmitter signal conductor pairs up to the second USB interface for electromagnetic shielding of the data signals.

14. The USB signal transmission system of claim 8, including a circuit board arranged in each of the adapters containing logical switching elements such as digital addition and/or subtraction.

15. An adapter for a USB signal transmission system including a first interface in the form of a USB interface with three USB signal conductor pairs (SSTX+, SSTX−; SSRX+, SSRX−; D+, D−), each pair being configured for the differential transmission of a USB data signal, and with a second interface with two transmitter signal conductor pairs, each pair being configured for the differential transmission of a data signal, such that a first common mode component is added to the differential USB data signal which is to be fed via the first USB signal conductor pair (SSTX+, SSTX−) in order to generate a first differential transmission signal for transmission via the first transmitter signal conductor pair (32) and a second common mode component is added to the differential USB data signal which is to be fed via the second USB signal conductor pair (SSRX+, SSRX−) in order to generate a second differential transmission signal for transmission via the second transmitter signal conductor pair (34), wherein the first common mode component corresponds to a signal portion (D+) of the differential USB data signal which is to be fed via the third USB signal conductor pair (D+, D−) or a multiple or a fraction thereof and the second common mode component corresponds to a reference portion (D−) of the differential signal which is to be fed via the third USB signal conductor pair (D+, D) or a multiple or fraction thereof.

16. The adapter of claim 15, wherein the second interface is an HSD interface.

17. The adapter of claim 15, including a USB3 socket and/or a USB3 cable connected to the USB interface and an HSD socket or an HSD cable connected to the second interface.

18. The method of claim 4, including the two conductor pairs shielded by a common shielding.

19. The method of claim 6, wherein said star quad arrangement is in the form of an HSD transmission system.

20. The USB signal transmission system of claim 10, wherein the cable in the star quad form is designed in the form of an HSD connection.

21. The USB signal transmission system of claim 12, including a shielding starting out from the first USB interface and running via both adapters and the transmitter signal conductor pairs up to the second USB interface for electromagnetic shielding of the data signals.

22. A USB signal transmission system including two adapters connected together via two pairs of transmitter signal conductors, wherein each of the adapters has a USB interface for the input/output of a USB signal, such that the USB interfaces in each case have three pairs of USB signal conductors (SSTX+, SSTX−; SSRX+, SSRX−; D+, D−) for the differential transmission of USB data signals which are coupled via a phantom circuit with the two pairs of transmitter signal conductors;

wherein the two pairs of transmitter signal conductors are arranged in a cable in a star quad form; and wherein said adapter includes a first interface in the form of a USB interface with three USB signal conductor pairs (SSTX+, SSTX−; SSRX+, SSRX−; D+, D−), each pair being configured for the differential transmission of a USB data signal, and with a second interface with two transmitter signal conductor pairs, each pair being configured for the differential transmission of a data signal, such that a first common mode component is added to the differential USB data signal which is to be fed via the first USB signal conductor pair (SSTX+, SSTX−) in order to generate a first differential transmission signal for transmission via the first transmitter signal conductor pair (32) and a second common mode component is added to the differential USB data signal which is to be fed via the second USB signal conductor pair (SSRX+, SSRX−) in order to generate a second differential transmission signal for transmission via the second transmitter signal conductor pair (34), wherein the first common mode component corresponds to a signal portion (D+) of the differential USB data signal which is to be fed via the third USB signal conductor pair (D+, D−) or a multiple or a fraction thereof and the second common mode component corresponds to a reference portion (D) of the differential signal which is to be fed via the third USB signal conductor pair (D+, D) or a multiple or fraction thereof.

\* \* \* \* \*